United States Patent
Wyman et al.

(10) Patent No.: US 6,243,225 B1
(45) Date of Patent: Jun. 5, 2001

(54) ADAPTIVE FILTER FOR REDUNDANT SENSOR SAMPLED MAGNETIC TAPE DRIVE CONTROL SYSTEM

(75) Inventors: Robert O. Wyman, Longmont; Shiba P. Panda, Englewood, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/178,453

(22) Filed: Oct. 23, 1998

(51) Int. Cl.[7] .................................................. G11B 5/584
(52) U.S. Cl. ............................................................ 360/77.12
(58) Field of Search .............................. 360/77.13, 77.12, 360/78.02, 75, 22, 18, 25, 69, 53, 31

(56) References Cited

U.S. PATENT DOCUMENTS

| | | |
|---|---|---|
| 5,257,252 | 10/1993 | Barnes et al. . |
| 5,262,908 | 11/1993 | Iwamatsu et al. . |
| 5,294,791 * | 3/1994 | Pahr ............................... 360/77.12 X |
| 5,426,543 | 6/1995 | Dy et al. . |
| 5,432,652 | 7/1995 | Comeaux et al. . |
| 5,550,685 | 8/1996 | Drouin . |
| 5,623,380 * | 4/1997 | Noguchi et al. ............... 360/77.13 X |
| 5,623,474 | 4/1997 | Oshio et al. . |
| 5,629,813 * | 5/1997 | Baca et al. ......................... 360/77.12 |
| 5,739,974 * | 4/1998 | Miller ................................. 360/78.02 |
| 5,943,180 * | 8/1999 | Seo et al. ............................ 360/77.12 |
| 5,946,159 * | 8/1999 | Chliwnyj et al. .................. 360/77.12 |

FOREIGN PATENT DOCUMENTS 0 677 844    10/1995    (EP) .

\* cited by examiner

*Primary Examiner*—Andrew L. Sniezek
*Assistant Examiner*—K. Wong
(74) *Attorney, Agent, or Firm*—Brooks & Kushman P.C.

(57) ABSTRACT

A method and system for controlling position of a tape head relative to a tape includes sensing the servo track of a tape with servo read elements of the tape head. A position error signal is then generated for each servo read element, indicative of a position of the servo read element relative to the servo track. The position error signal from each servo read element is then determined to be either an unexpected or an expected position error signal. A position error signal is unexpected when at least one measured parameter based on a function of movement of the position of the servo read element relative to the servo track is greater than a predetermined threshold limit and is expected when the at least one measured parameter is lesser than the predetermined threshold limit. A position error signal for each unexpected position error signal is then predicted based on a function of the expected position error signals from the other servo read elements and historical behavior of the unexpected position error signal. A feedback signal is then compiled as a function of the expected position error signals and the predicted position error signals. The tape head is then positioned as a function of the feedback signal.

7 Claims, 2 Drawing Sheets

ADAPTIVE FILTER FOR REDUNDANT SENSOR SAMPLED MAGNETIC TAPE DRIVE CONTROL SYSTEM

TECHNICAL FIELD

The present invention relates generally to magnetic tape drives and, more particularly, to an adaptive servo system and method for controlling the position of a tape head relative to magnetic tape.

BACKGROUND ART

In the information storage industry, increases in the data capacity of tape have been achieved with thinner tape substrates and with various data compression techniques. Advances in the magnetic tape media and tape head technologies have generated further increases in data capacity by increasing both the number of data tracks on a magnetic tape (by narrowing the width of each track) and the number of data read/write elements on the head.

The number of parallel, longitudinal data tracks which can be established on tape media has been limited by the number of read/write elements which could be fabricated on a head to read/write narrower tracks. Therefore, data tape drives have been designed to process a tape using a head having fewer sets of read/write elements than there are tracks on the tape. The tracks are divided into groups, each containing the same number of tracks as there are read/write elements in the head. To access all of the groups the head is indexed transversely relative to the tape width into a number of discrete positions corresponding to the number of groups of tracks. For example, a head having eight read/write elements can accommodate a tape having twenty four tracks if the tracks are divided into three groups of eight tracks each and the head has three index positions.

However, even when a head is indexed, there is a practical limit to the ability of a multi-track head to accurately and reliably record data to and read data from a tape having such a large number of very narrow tracks. Problems can be caused by track misregistrations, such as tape edge variations, environmental thermal expansion and contractions, inaccuracies in the path the tape follows in a drive, inaccuracies in the formatting of tracks on the tape itself, and dimensional and spacing deviations during the manufacturing of the head. It can be appreciated that even a minute "wobble" in the tape or a misalignment in the head can result in significant signal degradation, such as crosstalk and dropout, if a 12.7 mm tape has 128 tracks, each with a width of about 80 microns.

Consequently, a tape head actuator has been developed to index a tape head to one of several positions during track seek operations. For example, to access a tape having 128 tracks, a head having thirty two read/write elements indexes among four positions. Moreover, the actuator is also capable of rapidly adjusting the position of the head under servo control to precisely follow a set of tracks during read and write operations. In a drive employing such an actuator, the tape head has servo read elements for reading servo signals previously recorded onto one or more specially recorded servo tracks. Each servo element generates a position error signal which a position servo loop employs to determine the transverse position of the servo elements relative to the servo tracks. The loop then transmits a signal to the actuator to rapidly move the head by very small amounts as necessary to enable precise track following.

To improve the accuracy with which the servo loop operates, the tape can have two or more servo areas, each including a set of one or more servo tracks, spaced across the width of the tape. The tape head has a corresponding number of sets of servo elements. The position error signals generated by the servo elements are concurrently read and averaged to obtain a single feedback signal. The head position is maintained by the servo loop in response to the feedback signal, rather than the position error signal from any one servo read element. Such redundancy makes the servo loop less susceptible to error or failure by any one servo element. One such system includes three symmetrically spaced servo areas, each having three adjacent servo tracks, parallel to the data tracks.

However, accuracy problems in the position error signals can be caused by various sensor data integrity problems such as noise, servo format recording problems, media defects, tape to head interface variations, and servo channel hardware problems. Accordingly, a problem with averaging all of the position error signals to obtain the feedback signal is that the integrity of the feedback signal may not represent the true head position relative to the servo track if at least one of the position error signals is highly inaccurate.

SUMMARY OF THE INVENTION

Accordingly, it is an object of the present invention to provide a method and system for combining multiple servo track position error signals into a single feedback signal for use by a tape head actuator.

It is another object of the present invention to provide a method and system for determining a servo track position error signal to be unexpected and then predicting an expected position error signal to replace the unexpected error signal before determining the single feedback signal.

It is a further object of the present invention to provide a method and system for converging the predicted position error signals to actual position error signals once the position error signal is determined to be expected.

In carrying out the above objects and other objects, the present invention provides a method for controlling position of a tape head relative to a tape. The tape head includes servo read elements for reading a respective servo track written on the tape. The method includes sensing the servo tracks with the servo read elements. A position error signal is then generated for each servo read element. The position error signal for each servo read element is indicative of a position of the servo read element relative to the servo track. The position error signal from each servo read element is then determined either as an unexpected or an expected position error signal. A position error signal is unexpected when at least one measured parameter based on a function of movement of the position of the servo read element relative to the servo track is greater than a predetermined threshold limit and is expected when the at least one measured parameter is lesser than the predetermined threshold limit. A position error signal for each unexpected position error signal from a servo read element is then predicted based on a function of the expected position error signals from the other servo read elements and historical behavior of the unexpected position error signal. A feedback signal is then compiled as a function of the expected position error signals and the predicted position error signals. The tape head is then positioned as a function of the feedback signal.

Further, in carrying out the above objects and other objects, a tape drive system is provided in accordance with the above-described method.

The above object and other objects, features, and advantages embodiments of the present invention are readily

BEST MODES FOR CARRYING OUT THE INVENTION

Figure 1:
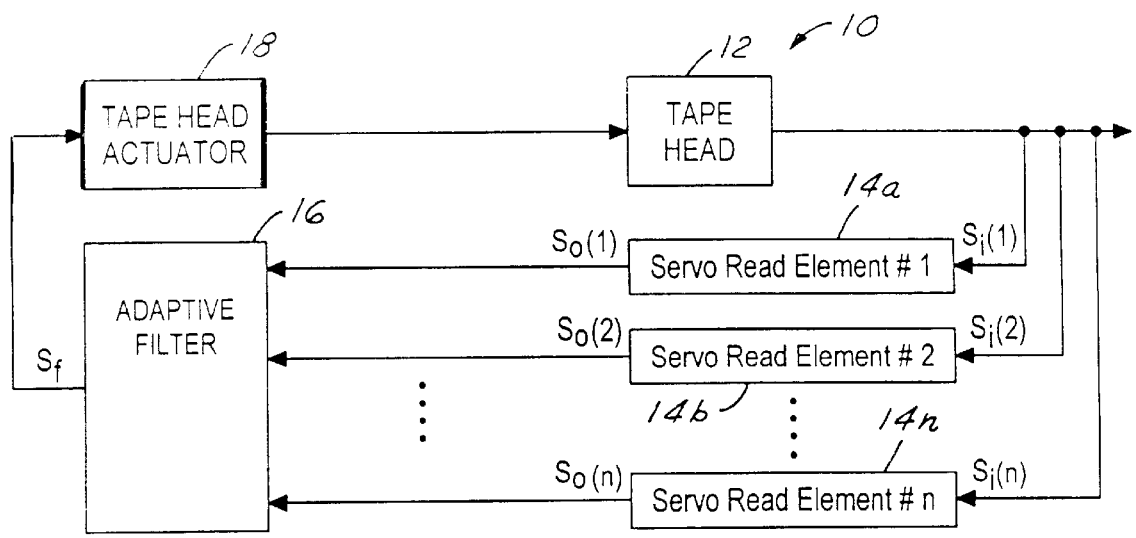
FIG. 1 is a block diagram of a magnetic tape drive system in accordance with the present invention.

Referring now to FIG. 1, a closed-loop magnetic tape drive system 10 in accordance with the present invention is shown. Tape drive system 10 includes a tape head 12 having servo read elements 14($a$–$n$) for providing respective position error signals $S_o(1)$, $S_o(2)$, ..., $S_o(n)$. The position error signals are indicative of the position of the head with respect to the magnetic tape in tape system 10. Servo read elements 14($a$–$n$) provide the position error signals to an adaptive filter 16. As will be described in greater detail below, adaptive filter 16 processes the position error signals to obtain a single composite feedback signal $S_f$. Adaptive filter 16 provides the feedback signal to a tape head actuator 18. Tape head actuator 18 adjusts the position of tape head 12 with respect to the magnetic tape as a function of the feedback signal. The process is continuously repeated to enable precise track following by tape head 12.

Figure 2:
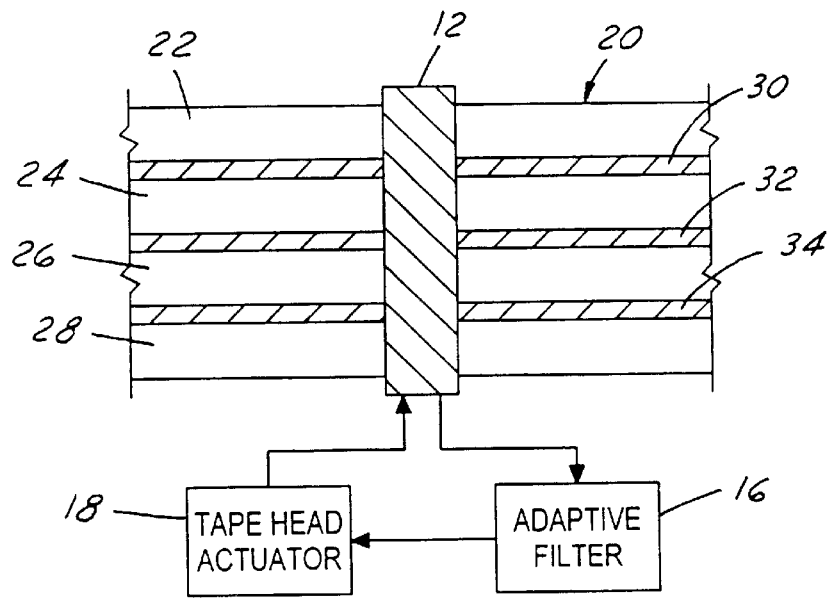
FIG. 2 illustrates magnetic tape in accordance with the present invention for use with the magnetic tape drive system shown in FIG. 1.

Referring now to FIG. 2, tape head 12 is shown positioned adjacent magnetic tape 20. Magnetic tape 20 includes four longitudinally-extending laterally-spaced apart data track areas 22, 24, 26, and 28. Redundant servo areas 30, 32, and 34 separate data tracks areas 22, 24, 26, and 28. Each of servo areas 30, 32, and 34 includes at least one servo track which is read by a corresponding servo read element 14($a$–$n$) of tape head 12 to generate the position error signals.

Figure 3:
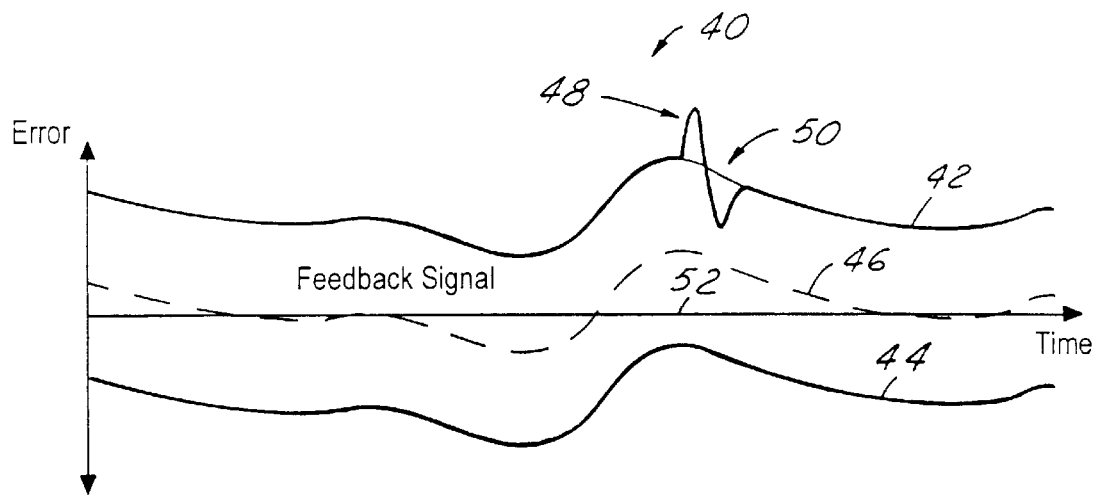
FIG. 3 is a graph illustrating the error of two position error signals and their composite feedback signal as a function of time.

Referring now to FIG. 3, a graph 40 illustrating the error of two position error signals 42 and 44 and their composite feedback signal 46 as a function of time is shown. Feedback signal 46 is generated as a function of position error signals 42 and 44 as described in greater detail below such that it likely represents the true position of tape head 12 relative to the sensed servo tracks, i.e., magnetic tape 20. It is desired that feedback signal 46 follow line 52, which represents zero error, as closely as possible.

Position error signal 42 includes a high frequency distorted area 48 at a given instant of time which is caused by a data integrity problem. An expected signal portion 50 of position error signal 42 is shown where distorted area 48 occurs. Expected signal portion 50 represents what distorted area 48 would have been if the data integrity problem had not occurred.

In the past, feedback signal 46 would be determined by taking the average of position error signals 42 and 44 at each instant of time. A problem with this approach is that distorted area 48 may have a large enough error such that when averaged with position error signal 44 at the given instant of time it could still cause feedback signal 46 to be inaccurate.

A feature of the present invention is that when a distortion in an error signal such as distorted area 48 occurs, an expected signal portion such as expected portion 50 is determined and then averaged at the given instant of time with other position error signals instead of the distorted area. Accordingly, an advantage of the present invention is that the feedback signal provided to tape head actuator 18 is likely to represent the true position of tape head 12 relative to magnetic tape 20.

Figure 4:
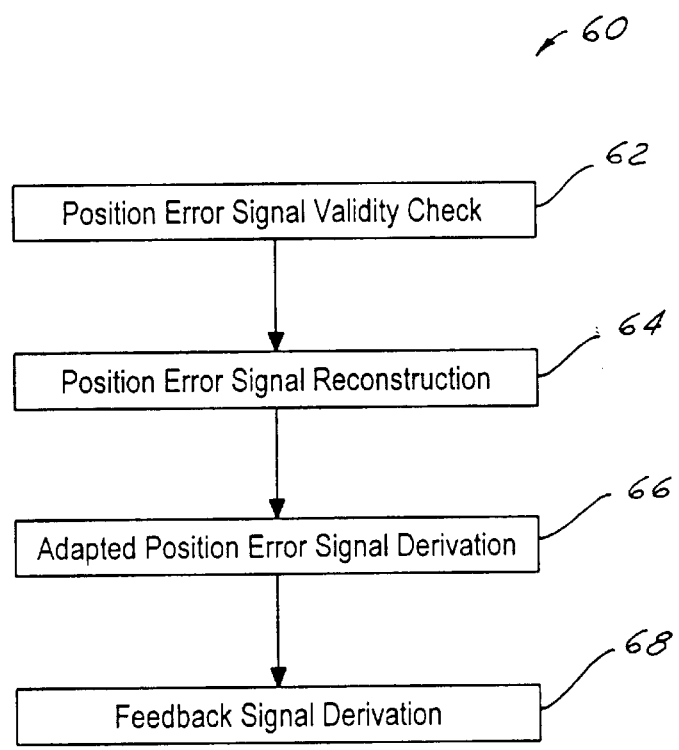
FIG. 4 is a flow diagram representing operation of the magnetic tape drive system and method in accordance with the present invention.

Referring now to FIG. 4, with continual reference to FIGS. 1–3, a flow diagram 60 representing operation of magnetic tape drive system 10 and a method in accordance with the present invention is shown. Operation begins with a position error signal validity check as shown in block 62. Initially, servo read elements 14($a$–$n$) provide digital position error signal samples to adaptive filter 16. Adaptive filter 16 then performs the validity check by digitally filtering each position error signal sample to invalidate unexpected signal samples. An unexpected position error signal is a signal that does not meet expectations of the true position of tape head 12. As described below, various criteria are used to determine when a position error signal is unexpected.

Adaptive filter 16 then performs position error signal reconstruction as shown in block 64. For this process, adaptive filter 16 predicts where a valid expected signal sample would have been expected for each invalid unexpected signal sample. Adaptive filter 16 predicts the expected signal sample for a servo read element from redundant valid signal samples from other servo read elements along with historical data of the invalid unexpected signal sample.

Adaptive filter 16 then performs adaptive position error signal derivation as shown in block 66. Adaptive filter 16 derives adapted signal samples for valid signals samples directly from the actual signal samples and for invalid signals directly from the predicted expected signal samples. Once an unexpected position error signal stabilizes and becomes valid, adaptive filter 16 adapts the predicted expected signal sample toward the actual signal sample until they converge.

Adaptive filter 16 then performs feedback signal derivation as shown in block 66. Adaptive filter 16 compiles a feedback signal for use by tape head actuator 18. The feedback signal is the average of the expected signals and the predicted expected signals.

Referring now back to FIG. 1, with continual reference to FIG. 4, the operation shown in flowchart 60 will now be described in greater detail. The following terms are used in the description $S_i$=Position Error Input Signal Sample
$S_o$=Position Error Output Signal Sample
$S_r$=Reconstructed Position Error Signal Sample
$S_a$=Adapted Position Error Signal Sample
$S_f$=Feedback Signal Sample
V=Signal Validity Weight, where 0<V<1
N=Total Number of Servo Read Elements (Redundancy Factor)

Servo read elements 14($a$–$n$) read servo tracks to obtain the position error input signal samples and then transmit the position error output signal samples to adaptive filter 16. The output signal samples generally differ from the input signal samples in that they include noise introduced to servo read elements 14($a$–$n$) during the reading and transmitting processes.

Position Error Output Signal Sample Validity Check

Adaptive filter 16 checks the following conditions to determine the validity of each position error output signal sample received from servo read elements 14(*a–n*) and then assigns a weight to the validity of each output signal sample.

a) No data available, $S_o(i,k)$ is undefined $$=> V(i,k)=0$$

where i=servo read element number, and k=sampling instant.

b) The magnitude of the sample derivative is too high, $$|dS_o(i,k)|>L_v$$

$$=> V(i,k)=0$$

where $L_v$ is the velocity threshold limit. As known to those skilled in the art, the velocity threshold limit is based on experimental data pertaining to various situations. It represents the velocity of the change of position of a servo read element 14 relative to a servo track.

c) The magnitude of the sample second derivative is too high, $$|d^2S_o(i,k)|>L_a$$

$$=> V(i,k)=0$$

where $L_a$ is the acceleration threshold limit. As known to those skilled in the art, the acceleration threshold limit is based on experimental data pertaining to various situations. It represents the acceleration of the change of position of a servo read element 14 relative to a servo track.

d) If the output signal sample is valid, but was recently invalid, its validity is given partial weight until full confidence in the signal validity has been restored, $$V(i,k)=V(i,k-1)+1/l$$

where l=signal convergence length. The signal convergence length defines the number of sampling instants over which a signal is restored to full validity. As known to those skilled in the art, the signal convergence length is based on experimental observation. It represents the number of sampling instants, preset by a user, in which the output signal sample is restored to full validity (V=1) from no validity (V=0).

e) Output signal samples that do not fail any of the above tests are deemed fully valid, $$V(i,k)=1.$$

Adaptive filter 16 repeats the validity check using lower threshold limits if more than a quorum of output signal samples are still valid. A quorum is a percentage of the output signal samples. This step is reiterated using lower limits to discard signal samples that contain moderate deviations from the majority. Essentially, with more than a quorum of valid output signal samples, moderate signal distortions can be discarded to enhance the integrity of the output feedback signal.

Position Error Signal Reconstruction

For each output signal sample that fails to have full integrity, (i.e. V(i,k)<1, adaptive filter 16 predicts where a valid sample point would have been expected. To predict a valid output signal sample for a servo read element, adaptive filter 16 uses valid output signal samples from other servo read elements and historical data of the suspect signal such that for each invalid output signal sample, $$S_r(i,k) = S_a(i,k-1) + \frac{\sum_{j=1}^{m}(S_o(j,k)-S_o(j,k-1))}{m}$$

where i=the element number of the servo read element providing an invalid output signal sample, j=the element number of the servo read element providing a valid output signal sample, k=sampling instant, and m=the total number of servo read elements providing valid output signal samples. As shown, the adapted signal sample is used for historical information in lieu of the previous output signal sample.

The above reconstruction is undefined if there are no other valid output signal samples from servo read element, (m=0). In this case, adaptive filter 16 uses a first-order hold approach, $$S_r(i,k)=S_a(i,k-1)+dS_a(i,k-1)$$

Alternatively, a zero-order hold could have been used here if the sampling rate is low relative to the signal bandwidth.

Adaptive filter 16 does not perform reconstruction for valid output signal samples, i.e., V(i,k)=1. In this case, $$S_r(i,k)=S_o(i,k)$$

Adapted Signal Derivation

Adaptive filter 16 now derives adapted signals for all of the output signal samples using the reconstructed signals and any validity weight determined in the previous steps. The calculation below converges reconstructed signals toward partially valid signals. Adapted signals for output signal samples with full validity (V=1) are derived directly from the output signal samples provided by servo read elements. Adapted signals for output signal samples with no validity (V=0) are derived directly from the reconstructed signals.

$$S_a(i,k)=V(i,k)S_o(i,k)+(1-V(i,k))S_r(i,k)$$

Feedback Signal Derivation

Adaptive filter 16 then compiles a single composite feedback signal to provide to tape head actuator 18. Tape head actuator 18 adjusts the position of tape head 12 as a function of the feedback signal. The feedback signal is the average of all the adapted signals such that, $$S_f = \frac{\sum_{i=1}^{n} S_a(i,k)}{N}$$

where N=the total number of servo read elements (redundancy factor).

In summary, the system and method of the present invention allows the tape head of a tape drive to precisely follow servo tracks written on magnetic tape. Multiple servo tracks are used simultaneously to overcome signal integrity problems that can occur. The present invention processes the multiple servo track position error signals to generate a single feedback signal for use by a tape head actuator. The single feedback signal represents a signal that is likely to represent the true position of a tape head.

Thus it is apparent that there has been provided, in accordance with the present invention, a method and system for controlling position of a tape head relative to a tape that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for controlling position of a tape head relative to a tape while the tape is moving across the tape head, wherein the tape head includes servo read elements each for reading respective servo tracks written on the tape, the method comprising:

sensing the servo tracks with the servo read elements;

generating a position error signal for each servo read element, the position error signal for each servo read element being indicative of a position of the servo read element relative to the servo track;

determining if the position error signal from each servo read element is an unexpected or an expected position error signal, wherein a position error signal is unexpected when at least one measured parameter based on a function of movement of the position of the servo read element relative to the servo track is greater than a predetermined threshold limit related to the position of the servo read element relative to the servo track and is expected when the at least one measured parameter is less than the predetermined threshold limit;

predicting a position error signal for each unexpected position error signal from a servo read element based on a function of the expected position error signals from the other servo read elements and historical behavior of the unexpected position error signal;

compiling a feedback signal as a function of the expected position error signals and the predicted position error signal; and positioning the tape head relative to the tape as a function of the feedback signal while the tape is moving across the tape head.

2. The method of claim 1 wherein:

the at least one measured parameter is the rate of change in the position of the servo read element relative to the servo track, and the predetermined threshold limit is a predetermined velocity threshold limit.

3. The method of claim 1 wherein:

the at least one measured parameter is the first derivative of the rate of change of the position of the servo read element relative to the servo track, and the predetermined threshold limit is a predetermined acceleration threshold limit.

4. The method of claim 1 wherein:

a position error signal is unexpected if the position error signal is determined to be expected at a given instant and was determined to be unexpected within a predetermined interval of the given instant.

5. The method of claim 4 wherein:

the position error signal predicted for an unexpected position error signal is based on the expected position error signals and historical behavior of the unexpected position error signal such that the predicted expected position error signal converges to the expected position error signal once the position error signal is determined to be expected at a given instant of time.

6. The method of claim 1 wherein:

the position error signal predicted for an unexpected position error signal is based on the average of the expected position error signals and historical behavior of the unexpected position error signal.

7. A tape drive system comprising:

a tape head movable relative to a tape, the tape head having a plurality of servo read elements for sensing respective servo tracks written on the tape and then generating respective position error signals, each position error signal being indicative of a position of the respective servo read element relative to the respective servo track;

an adaptive filter operable with the tape head to receive the position error signals, wherein the adaptive filter determines if the position error signal from each servo read element is an unexpected or expected position error signal, wherein a position error signal is unexpected when at least one measured parameter based on a function of movement of the position of the servo read element relative to the servo track is greater than a predetermined threshold limit related to the position of the servo read element relative to the servo track and is expected when the at least one measured parameter based on a function of movement of the position of the servo read element relative to the servo track is less than the predetermined threshold limit, wherein the adaptive filter predicts a position error signal for each unexpected position error signal from a servo read element based on a function of the expected position error signals from the other servo read elements and historical behavior of the unexpected position error signal, wherein the adaptive filter compiles a feedback signal as a function of the expected position error signals and the predicted position error signal; and a tape head actuator operable to adjust the position of the tape head relative to the tape as a function of the feedback signal while the tape is moving across the tape head.

* * * * *